March 16, 1965   G. F. WITTGENSTEIN   3,173,271
UNDERWATER PIPELINE INSTALLATION
Filed May 8, 1961                3 Sheets-Sheet 1

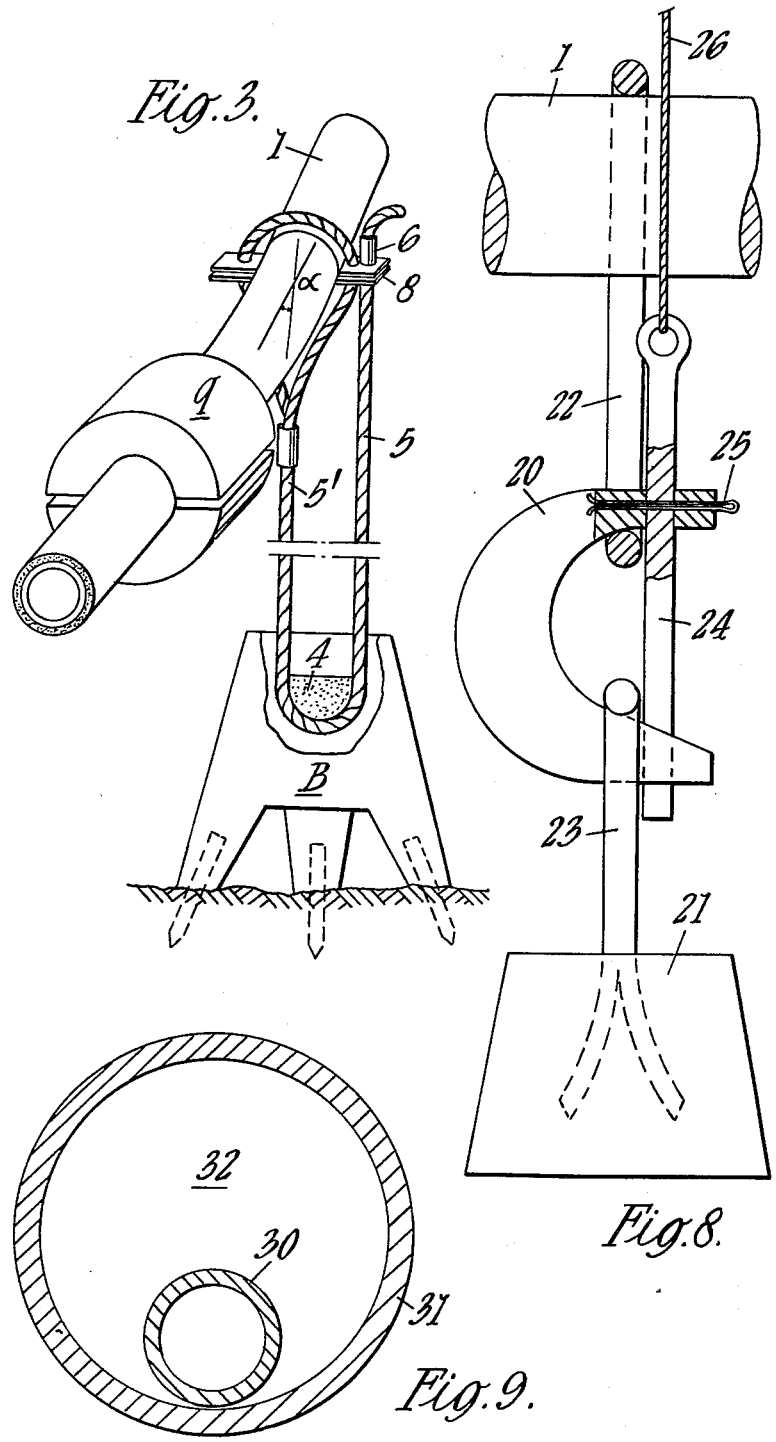

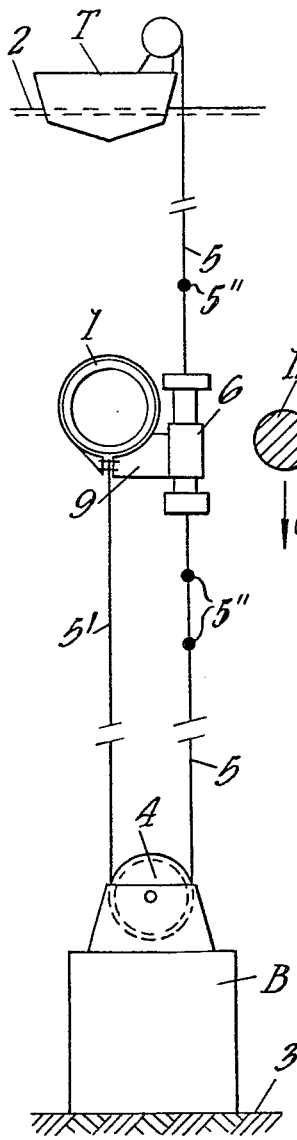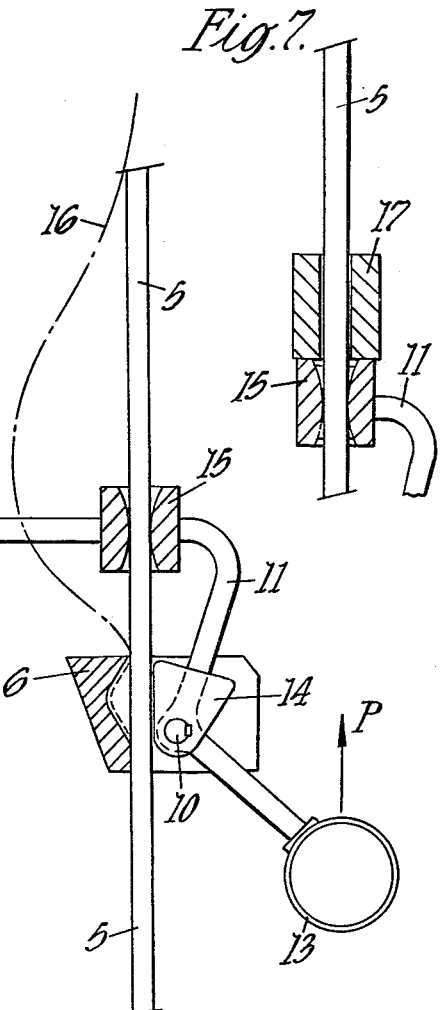

United States Patent Office 3,173,271
Patented Mar. 16, 1965

3,173,271
UNDERWATER PIPELINE INSTALLATION
Gérard F. Wittgenstein, Postbox Montchoisi,
Lausanne, Switzerland
Filed May 8, 1961, Ser. No. 129,914
Claims priority, application Switzerland, May 11, 1960,
5,431/60; June 9, 1960, 6,608/60; Sept. 2, 1960,
9,929/60; Jan. 18, 1961, 616/61
2 Claims. (Cl. 61—72.1)

The present invention relates to an underwater pipeline installation as well as to its method of installation. The pipeline, while generally of steel or light metal, may be of any material and be located in the sea, a lake, river, canal, and so forth.

The operating position of the pipeline can be freely selected and is not necessarily the same for all points along its length. The ordinates of the pipeline are in practice chosen or modified in terms of several factors with a view to avoiding obstacles to navigation, possible zone of transverse currents, the vulnerability of the pipe and so forth. The pipeline when installed is therefore not necessarily horizontal over its whole length.

The pipeline which may be naturally buoyant or be quipped with positive buoyancy means $p_0$ is held at each of a series of attachment points by at least one cable wound, at least partly, around a pulley or a drum mounted on an anchor weight, previously immersed on the bed plumb with the attachment point, the two runs of the cable, on either side of the drum, being constantly stretched at least between the pulley and a member for maintaining the position of the pipeline for as long as the attachment point is immersed, which member is placed at the level of the pipeline, at whatever level the latter may be.

The installation consists of the pipeline itself, anchor weights and pulleys, locking devices and cables.

The spacings of the attachment points are variable; being more widely spaced as either resultant buoyancy $p_0$ decreases, or the efficiency of the blocking devices increases, or the immersion zone is calmer or their inclination in the direction of possible transverse currents is less. The spacings determine the lengths of the undulations of the pipeline in the vertical plane between two attachment points.

The length of pipeline being laid extends over several spacings; its resultant elastic line necessarily passes through the attachment points the ordinates of which are constantly under control, thus avoiding excessive curvatures over this length, moreover, this length is, at each attachment point, moored not only to the blocks but also to the barges; this mooring confers thereto a resistance to transverse currents.

The installation is effected in a single stage if the immersion operations of the pipeline, consisting of lengths assembled on shore and towed in a floating condition to above their underwater sites where they are joined end to end, are carried out without interruption until the pipeline is in place in its operating position. The installation is effected in several stages if the immersion operations are likely to be interrupted—as a result of a storm for example—and, during said interruption, at least one section of the pipeline is immersed and locked in a temporary position. Another form of installation is one in which at least one section of the pipeline is immersed from one operating position to another operating position or when at least one section of the pipeline is raised from one operating position to a temporary overhaul position on the surface and then immersed into operating position.

Considering known underwater pipelines, the pipeline according to the present invention has, amongst others, the following essential advantages:

(a) It is placed as desired very near the bed—even resting thereon between two attachment points—or at any level under the surface, in freely chosen zones.

(b) Accordingly, it is independent of the depths of water and of the inequalities of the bed, and secured from breakage due to turbidity currents or to excessive spans on eye-bolts on the bed; it avoids the considerable work of surveying the beds and the bends of the lie; it is secured from tears due to rocky contacts, to the bearing down of stones and therefore saves mechanical protective coatings.

(c) The length being laid is not abandoned to the action of transverse currents; at as many points as desired, it is doubly moored on the one hand to the anchor weights and on the other hand to motorized barges which strive to remain stationary.

(d) The elastic line of the length being laid is not free to move by itself; by means of as many necessary ordinates as desired, its shape is constantly under control.

(e) The pipeline is repairable and removable at any time; the laying operations may be interrupted.

The means for carrying out the installation consist, considered together or separately:

(1) Of equipment adapted to displace through the pipeline—in case it should not naturally possess this characteristic—a weight of water $p_1$ slightly exceeding its own weight $p_2$ in air; the resultant buoyancy per yard, that is to say $p_0 = p_1 - p_2$ is thus directed upwardly (positive buoyancy) and ranges from one to more pounds.

(2) Of ballast weights judiciously placed on the pipeline with the purpose, on the one hand, to reduce the dips of the pipeline between two attachment points and, on the other hand, to displace the bending zones—bending moment=0—towards the attachment points.

(3) Of locking devices responsive to the tension of the cable, mounted on the pipeline in the vicinity of the attachments, with a view to preventing any rising movement of the pipeline and thus freeing the laying barges from this function, the said devices being also able to unblock instantaneously when necessary.

(4) Of remote control equipment operating from the laying barges, the locking and unlocking apparatus.

(5) Of winches mounted on barges and of cables, the latter sliding on members, drums or pulleys, which rigidly cooperate with anchor weights immersed in the bed, one end of the cables being secured to the pipeline with a view to immersing the same, in spite of the upward direction of the resultant buoyancy.

(6) Of automatically detachable sinkers compensating, during laying, the weight of the fluid or fluids to be transported by the pipeline when the same is put into operation.

If the pipeline, filled and protected by the usual bituminous or other coatings, is not, by its very nature, endowed with a positive buoyancy—such for example as is the case of a steel tube transporting liquid hydrocarbons—this characteristic is conferred thereto before immersing the same and to this end, the liquid transporting tube is placed inside a second tube which serves as a float for the inner tube; the space between the inner tube and the enclosing tube being, for example, employed for the transport of a gas. It is also obviously possible to do the contrary and fill this space with liquid, the inner tube being then filled with gas and serving as a float.

The respective diameters of the tubes forming this multitude pipeline are determined in terms of the densities of the tubes and of the products transported with a view to obtaining a positive buoyancy pipeline. The inner tube may be rigid or flexible, centered by cross-pieces in the axis of the casing, or not.

In order to position the pipeline which floats above its operating site, one proceeds as follows:

A certain number of motor vessels or barges are disposed along a section of the pipeline at points, which will be the attachment points, spaced at intervals one from the other, each of the barges having a raising device such as a winch and each loaded with at least one anchor weight.

The operators of each barge pass the end of a cable wound on the winch through the cable locking device and then around a pulley mounted on the anchor weight before hooking it provisionally to a barge.

They sink to the bed at least one anchor weight by unwinding the cable from the winch, the cable thus running round the pulley.

Then they unhook the end of the cable, secure it to an attachment device connected with the pipeline and, insofar as the said device does not rigidly cooperate with the blocking device, they rigidly connect this device to the pipeline.

They then wind the cable on the winch so as to pull the pipeline attachment elements towards the bed; this operation is performed simultaneously on each barge, the winding speeds being different and adapted to the formation of an elastic line wherein a projection of the pipeline on a vertical plane parallel to the pipeline axis—is deprived of any dangerous stresses and progressively translated. By coordinating their immersion operations, the barge operators control the elastic line and its translation; this coordination may be effected by luminous, sound, or wireless signals; it may even be set to program and take place automatically; when an attachment point has reached the desired depth, the locking device is remote controlled from the barge, so as to prevent any rising tendency of the pipeline. The link between the cable and the winch is then broken off thus freeing the barge, which proceeds towards a fresh immersion station following the highest end immersion station where the operation is repeated and so on until the whole pipeline is immersed at the determined ordinates.

At any timely moment, before the operation of submerging the pipeline, the same may if necessary be ballasted.

If the operation takes place as above described, the installation is carried out in one stage, but if the work has to be interrupted, the above description only differs in that the remote control of the locking devices is set in operation before the pipeline attachments actually reach the finally desired depths and in that the freed barges do not proceed towards new immersion stations. Instead when work is resumed, the barges return to the sites which they had abandoned and their operators seize the free ends of the cables, join them to the cables wound on the winches, remotely control the unlocking and resume the immersion operation until either a further interruption, or the attainment of the desired depths.

It may also happen that, for one reason or another, it may be desired months or years after installation to change the position of a sector or bring it temporarily to the surface. In such a case, the barges are placed along the sector directly above the blocks and their operators seize the free end of the cables, join them to the winches, remotely control the locking apparatus and lower or, as the case may be, allow the said pipeline sector to rise. In order to facilitate the seizing, the free ends may be loaded with a mass and cast on to the bed as far away as possible from the pipeline; or they may be fixed by suitable means to buoys, either floating or submerged, which in no way hinder navigation, so insignificant are their dimensions if the cables are chosen of a material such as nylon or terylene, the density of which, even if they are reinforced with a few metallic wires, is hardly greater than that of water. It is, on the other hand, easy to follow from the surface of the water the lie of the immersed pipeline by magnetic, wireless, ultrasonic or other means.

Other characteristics of the invention will appear from the following description of embodiments shown by way of example in the accompanying three drawing sheets.

FIGURE 3 shows, on a large scale, the region of an attachment point;

FIGURE 5 shows in cross section an immersion element;

FIGURE 6 shows a cable locking device;

FIGURE 7 shows a particular form of rocker for a cable locking device;

FIGURE 8 shows a form of automatically detachable sinker; and

FIGURE 9 shows in cross-section a double tube (multi-tube with two pipes).

In all the figures, 1 represents the pipeline, 2 the surface of the water, 3 the bed, $a_1, a_2, \ldots a_n$ attachment stations of the pipeline to corresponding anchor weights $B_1, B_2 \ldots B_n$, $h_n$ the depth—measured from the surface—of the point $a_n$ and L the spacing, variable, between two consecutive attachment stations.

Figure 1:
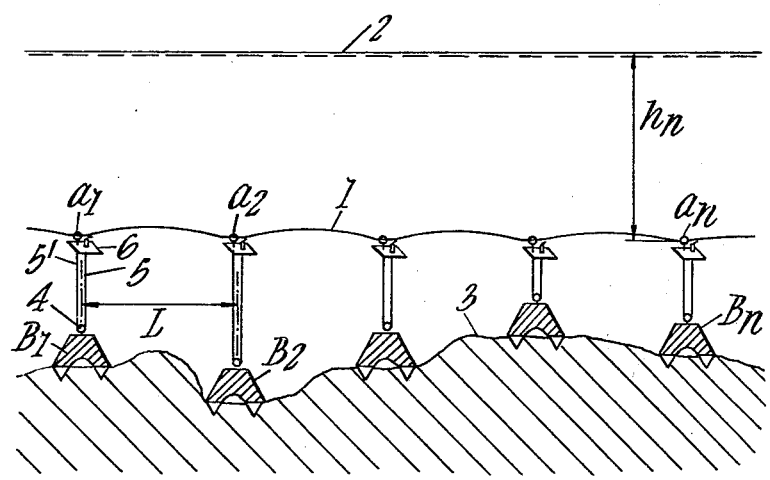
FIGURE 1 shows an immersed pipeline.

Referring now to FIGURE 1, there is further seen at 4 a pulley on which the cable is wound, one part 5' of the cable coupling to the pipeline attachment while the other part 5 couples to the locking device, shown diagrammatically at 6. According to this version, the attachments are at the troughs of the undulating curve of the elastic line of the pipeline.

Figure 2:
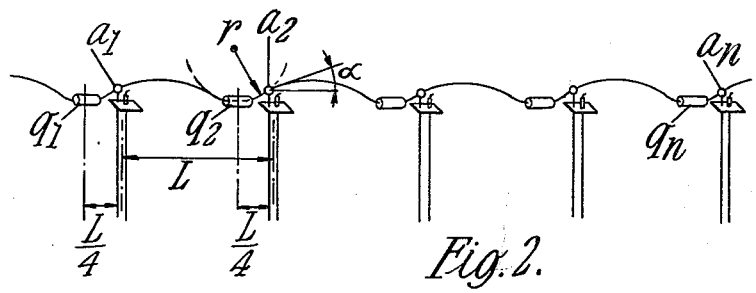
FIGURE 2 shows the undulating elastic line of a pipeline when immersed and provided with ballast.

Referring to FIGURE 2, it will be seen that between the attachments, at points situated at a distance of about $L:4$ from the latter, on their left for example, the pipeline has been loaded with counter weights $q_1, q_2 \ldots$ which obviously have the effect of lowering the pipeline at these points and of modifying the undulations of FIGURE 1 in that the two half-waves are more nearly identical and the dip of the undulation, and therefor also the maximum bending moment, are more reduced; $r$ represents the minimum radius of curvature whereas in FIGURE 1 it has not been possible to draw it at $a_1$ or $a_2$, as it would be so small.

But the ballasting of the pipeline also has another effect; namely that the trough of the curve has been displaced and is no longer, as in FIGURE 1, at the attachment point which is now in the bending zone. At the attachment points, pipeline is inclined at an angle $\alpha$ to the horizontal, which will greatly facilitate the laying as will be seen in FIGURE 4.

The counter-weights may advantageously be made of concrete semi-cylinders—as shown in FIGURE 3—which are bolted together or fixed by any other means. FIGURE 3 also shows the detail of the attachment which is for example a loop of the strand 5' of the cable, the detail of the drum 4 of the weighting block B, the latter reinforced with small bars which easily sink into a muddy bed. The locking device is diagrammatically shown at 6 by a sleeve cooperating with a plate 8 the bores of which, having the diameter of the cable, are traversed by the attachment loop and by the cable part 5; as soon as the sleeve grips and wedges this cable part, the sleeve abuts against the plate and prevents any upward movement of the pipeline.

Figure 4:
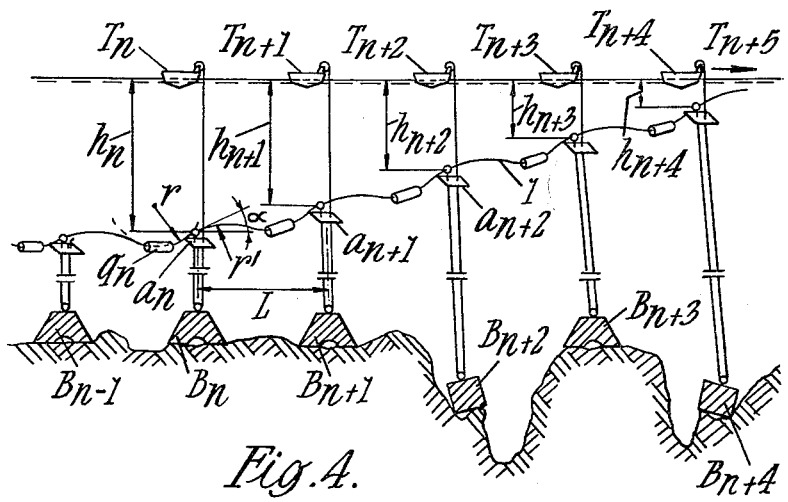
FIGURE 4 shows a sector of the pipeline in the course of immersion.

Referring to FIGURE 4 there is shown a pipeline sector in the course of immersion between the indication point $n$ and the indication point $n+4$; to the left of the indication point $n$ the pipeline is supposed to be in place, whereas to the right of the indication point $n+4$, it still floats; the connecting branch between the laid pipeline and the floating pipeline is held by the cables of the winches of the barges T; the dimensions $h_n$, $h_{n+1}, \ldots$ etc. decrease and one sees the advantage of the angle $\alpha$ which start the progressive elevations of the branch.

The elastic line of the branch is completely controlled by obliging it to pass through the points $a_n, a_{n+1}$, etc. ... the consecutive variations in level of which are maintained at a mechanically permissible value without risk of rupture; for example, which one will bring down $a_{n+1}$ to the level $h_n$, at the same time one will bring $a_{n+2}$ to the level of $h_{n+1}$, and so on; one will therefore reproduce on the right of the figure, and at the distance of the spacing L, the same connecting branch and in such a way one will have positioned a length L of the pipeline.

Laying is effected without stress, by progressive translation of the connecting branch.

As soon as an attachment has reached its operating level, the operators of the corresponding barge lock the cable at this level, as will be seen hereafter and unfasten—or cut—the cable; thereafter, the freed barge proceeds towards a new position $T_n+5$ where its operators will immerse a block, attach the pipeline and start the operation again.

FIGURE 5 shows the details of an immersion unit; all the elements of which, except the locking device have already been described. The locking device has a frame 6 which is mounted on the pipeline by means of the attachment 9 and the detail of which, in a section parallel to the pipeline, appears in FIGURE 6. In this section, there is shown a lever 11 terminated at its upper portion by a solid mass and the weight Q of which in the water is directed downwardly and at its lower portion by a hollow mass 13 the resultant thrust P of which is directed upwardly. The shaft 10 may rotate in a bore of the frame 6; on the shaft are keyed the lever 11 as well as a cam 14; the lever comprises a sleeve 15 traversed by the strand 5 of the cable; in spite of the rotating torque created about the shaft 10 by the masses 12 and 13, the device cannot pivot since the tension of the strand 5 of the cable is opposed to the movement of the sleeve 15. But if, from the winch of the barge, one gives slack to the cable which assumes the elbow bend show at 16, the device pivots under the action of the torque and the cam jams the cable against the frame and locks the position of the pipeline.

In order to unlock the cable it is sufficient merely to retenson the cable from the barge thus straightening it and obliging the device, including the cam, to resume the initial position; the position of the pipeline is thus unlocked. The locking and unlocking by remote control from the surface of the basin is thus effected simply and by means of the strand to be locked or unlocked. One only of the two masses 12 and 13 would suffice to create the rocking torque but in disposing of a mass 13 of which the thrust balances the weight of the whole device, one avoids a modification state of equilibrium of the pipeline. It is advantageous, in view of the torsion imposed on the pipeline if the masses 12 and 13 are unbalanced, to dispose the apparatus alternately on one side and the other of the pipeline at two consecutive attachment points.

The profiles of the jaws of the cam and of the frame which jam the cable may be fluted, elongated, be provided with linings, or be otherwise shaped and constructed so as to increase to a maximum the friction of the cable on these jaws; for example, the gripping efficiency is increased if one forces the cable to distort itself along a line having one or more small curvature radii.

Another means of increasing the jamming efficiency consists in lining the cable with projections 5″, such as a knotted cord, of small size, disposed at short intervals, for example 1 yard, one from the other.

The object of these projections 5″ is obviously to facilitate the jamming; they may be constituted in many ways, for example by pincers gripping the cable, by small soldered sleeves, etc. The cables are of any material or section; if they are made of metallic braid or of synthetic fibers, it is easy to insert in the texture a thick weft thread which, periodically, thickens the section over a short length for instance by winding it in form of a spiral.

The torque may be furnished by any sources of energy although the gravitation given by way of example is the simplest.

The satisfactory operation of the device is due to a differential dynamic effect which is, accordingly, a characteristic claimed; when slack is given to an active strand, the attachment point of the pipeline is free to rise, but since the mass of the length of pipeline of several hundred yards, supported by this attachment, is very appreciable having regard to the resultant force (thrust-natural weight) ranging from one to several pounds per yard applied thereto, the acceleration of this rising movement is very small; on the contrary, the acceleration of the torque movement is—if the masses are of steel—of the order of 90% of the acceleration $g$. Thus the locking movement is much more rapid than the downward escape movement of the strand 5 of the cable. FIGURE 5 also shows the subjection of an attachment to the connection of the block to the barge; this subjection explains the resistance opposed to transverse currents.

FIGURE 7 shows a version according to which a ring 17, bearing by its weight on the upper surface of the sleeve 15, produces the rocking about the shaft. The sleeve may be there initially because it is inactive so long as the cable is under tension but one can also, from the barge, allow it to slide along the cable when it is desired to create the torque, that is to say just before giving slack.

It is desirable that the resultant buoyancy $p_0$ should not change appreciably as a result of filling, failing which the parameters of the elastic line would not be the same before and after the putting into service. If the weight of the fluid is only, per yard, a fraction of a couple of pounds, compensation is not necessary; it is to be recommended if this weight of fluid per yard is more appreciable. The pipeline is then provided with sinkers whose weight approximately balances that of the product which is to be transported and these sinkers are withdrawn one or more at a time or in a continuous manner when the pipeline is put under pressure. These retractable sinkers may be fluid or solid and FIGURE 8 shows an example of solid sinkers, which are automatically detachable, distributed along the pipeline.

In this figure, a sinker 21—consisting for example of a block of concrete—is suspended from the pipeline 1 by means of a hook 20 and two connecting members 22 and 23 which may be cables or bars. The hook is closed by a latch 24 held in place by a pin 25; a cord 26 is fixed to the latch and leads to the barge; the pin may be sheared by a shearing effort much less than the weight of the sinker in the water, so that if the operators of the barge pull on the cord, they shear the pin, pull the latch, open the hook and the sinker falls on to the bottom.

As the filling proceeds, sinkers are detached; for example, first of all the sinkers 1, 10, 20 etc. then the sinkers 2, 11, 21, etc. then the sinkers 3, 12, 22, etc. if the distribution of the sinkers along the pipeline follows the numerical order 1, 2, 3, 4 . . . but the sinkers may also be grouped and for example 5 sinkers may be at one point, 5 sinkers a little further on etc. and, in this case, one sinker of each group is first of all detached, then a second sinker of each group and so on.

The tares may also, partly or wholly, be substituted for the ballasts; in such a case, groups of tares are disposed at the ballasting points; when the tares are detached, the pipeline being in position, the angle of the elastic line at the attachment point is no longer of interest.

Finally, if one refers to FIGURE 9, one sees at 30 an inner tube and at 31 an outer tube or casing; if, for example, it is the inner tube which transports liquid hydrocarbon, the gas is transferred into the space 32. It may be advantageous to choose a flexible material for the inner tube, for example plastic provided or not with a reinforcement; the preparation of the double tube takes place as follows: one disposes end to end the $m$ tubes which are to form the metallic casing or float, leaving a space between them; with a rod, one then pushes the end of a cable from spacing to spacing until the cable issues from tube No. 1 near the coil on which is wound the plastic tube the beginning of which is hooked to the end of the cable. The lengths of casing are then soldered one to the other so as to form a section; the cable, preferably metallic, does not interfere with the welds. One then draws the cable which pulls the plastic and one positions the inner tube, allowing the tube No. $m$ to project therefrom to a small extent; subsequently, one joins together the sections of the flexible tube, preferably by means of suitable joints, before welding together the sections of the casing.

The pipeline described serves in general for the transport of gaseous hydrocarbons or liquids, it being understood that it may also remain empty or full of air or another gas and serve for other purposes, for instance as a channel for hertzian waves.

I claim:

1. A method of laying and maintaining in place a submarine pipeline, which displaces a weight of water slightly less than its own weight in air, with provision for suspending or interrupting the laying operation in case of emergency and subsequent resumption of the laying operation, which method comprises arranging a predetermined number of motorized craft along a pipeline sector at intervals corresponding to the eventual and successive points of attachment of the pipeline, each craft being equipped with a cable, a winch and an anchor weight; passing an end of said cable through a remote control cable locking device and around a drum associated with the anchor weight and temporarily securing the end to the respective craft; lowering the anchor weight to the bottom by allowing the cable to unwind from the winch; uncoupling the end of the cable from the craft and securing it to a pipeline attachment element in operative connection with the cable locking device; winding the cable on the winch for the purpose of lowering the said pipeline attachment element together with the pipeline to a required predetermined depth; giving slack to the cable by unwinding it from the winch so as to cause the cable locking device to firmly secure the pipeline and the pipeline attachment element at the said predetermined depth.

2. A method of laying a submarine pipeline with provision for suspending or interrupting the laying operation in case of emergency and subsequent resumption of the laying operation, which method comprises arranging a predetermined number of motorized craft along a pipeline sector at intervals corresponding to the eventual and successive points of attachment of the pipeline, each craft being equipped with a cable having spaced projections, a winch and an anchor weight; passing an end of said cable through a remote control cable locking device and around a drum associated with the anchor weight and temporarily securing the end to the respective craft; lowering the anchor weight to the bottom by allowing the cable to unwind from the winch; uncoupling the end of the cable from the craft and securing it to a pipeline attachment element in operative connection with the cable locking device; winding the cable on the winch so as to lower the said pipeline attachment element together with the pipeline towards a required predetermined depth; temporarily interrupting the lowering process, before the pipeline has reached the said predetermined depth, by causing, by remote control from above the surface, the cable locking device to clampingly engage the cable and so secure the pipeline and the pipeline attachment element at the intermediate depth reached when the interruption in the cable laying operation takes place, the clamping engagement of the cable by the cable locking device being facilitated by the presence of said spaced projections; resuming the cable laying operation by releasing by remote control from above, the cable from clamping engagement of the cable locking device and further lowering the pipeline and the pipeline attachment element to the required predetermined depth by winding the cable on the winch.

References Cited by the Examiner

UNITED STATES PATENTS

| 131,322 | 9/72 | Anderson | 61—42 |
| 447,735 | 3/91 | Moeser | 61—42 |
| 650,134 | 5/00 | Phillips | 61—72.3 |
| 2,067,717 | 1/37 | Lawton et al. | 61—72.6 X |
| 2,131,445 | 9/38 | Lawton. | |
| 2,432,342 | 12/47 | Shaner | 280—193 |
| 2,770,950 | 11/56 | Collins | 61—72.3 |
| 2,783,027 | 2/57 | Gilbert | 61—72.3 |
| 2,981,074 | 4/61 | Wilder | 61—72.3 X |
| 3,021,864 | 2/62 | Young | 137—236 |

FOREIGN PATENTS

| 1,520 | 1858 | Great Britain. |
| 1,607 | 1858 | Great Britain. |
| 2,141 | 1866 | Great Britain. |
| 863,000 | 3/61 | Great Britain. |
| 1,206,378 | 8/59 | France. |

JACOB L. NACKENOFF, *Primary Examiner.*

J. SHAPIRO, *Examiner.*